(12) United States Patent
Carrillo et al.

(10) Patent No.: US 6,899,313 B2
(45) Date of Patent: May 31, 2005

(54) MAGNETIC ACTUATOR AND METHOD

(75) Inventors: Conrado Carrillo, Chihuahua (MX); Viswanathan Subramanian, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 149 days.

(21) Appl. No.: 10/603,972

(22) Filed: Jun. 25, 2003

(65) Prior Publication Data

US 2004/0262557 A1 Dec. 30, 2004

(51) Int. Cl.$^7$ ............................................... F16K 31/00
(52) U.S. Cl. ........................... 251/129.08; 251/129.07; 251/129.18; 123/90.12
(58) Field of Search ........................ 251/129.07, 129.08, 251/129.15, 129.18, 129.19; 123/90.12

(56) References Cited

U.S. PATENT DOCUMENTS

| | | | |
|---|---|---|---|
| 4,635,683 A | * 1/1987 | Nielsen | 137/625.65 |
| 4,679,593 A | 7/1987 | Sanders | 137/625.65 |
| 5,707,039 A | 1/1998 | Hamilton et al. | 251/129.17 |
| 6,019,203 A | 2/2000 | Patel et al. | 192/3.3 |
| 6,062,823 A | * 5/2000 | Kawaguchi et al. | 417/222.2 |
| 6,116,269 A | 9/2000 | Maxson | 137/487.5 |
| 6,189,519 B1 | 2/2001 | Press et al. | |
| 6,308,725 B1 | 10/2001 | Lawlyes et al. | 137/14 |
| 6,422,360 B1 | 7/2002 | Oliver et al. | 188/266.5 |
| 6,435,472 B1 | * 8/2002 | Najmolhoda et al. | 251/50 |
| 6,615,780 B1 | 9/2003 | Lin et al. | 123/90.17 |
| 6,792,975 B2 | * 9/2004 | Erickson et al. | 137/625.65 |
| 2002/0190234 A1 | 12/2002 | Carrillo et al. | 251/129.08 |

* cited by examiner

Primary Examiner—J. Casimer Jacyna
(74) Attorney, Agent, or Firm—Jimmy L. Funke

(57) ABSTRACT

A method and assembly for controlling a plunger of a magnetic actuator includes generating a magnetic flux at the plunger that opposes a first bias from a first spring having a first preload. A second spring opposing the first bias is disposed in series communication with the first spring. The second spring has a second preload less than the first preload and is configured to be adjustable to control the amount of magnetic flux needed to overcome a net total preload opposing the magnetic flux. A second magnetic flux higher than the first magnetic flux is generated biasing the plunger to overcome the net total preload from the first and second springs in series communication.

40 Claims, 3 Drawing Sheets

MAGNETIC ACTUATOR AND METHOD

TECHNICAL FIELD

The present invention is related to solenoid operated control valves, and particularly such valves having application with lubricating hydraulic fluids in hydro-mechanical apparatus such as motor vehicle automatic transmissions.

BACKGROUND

It will be recognized that a solenoid assembly can be used in various actuator assemblies for actuation of a certain component and not limited to motor vehicles or internal combustion engines. One use for an actuator assembly having a linear solenoid involves a vehicle automatic transmission. Electromechanical solenoid operated control valves are widely used in the area of electronically controlled automatic transmissions. Two general types of such control valves include pulse width modulated (PWM) control valves and linear control valves. Both types are responsive to a control quantity, typically time varying voltage, to control line pressure, clutch chamber pressure or pilot pressure in a spool valve. It is generally understood that PWM valves have an armature which strokes between first and second positions substantially in frequency correspondence with a time varying voltage signal while a linear control valve has an armature which assumes an equilibrium position in accordance with the electromagnetic force generated by the average current through the solenoid coil and internal bias spring and hydraulic forces.

Low leak linear solenoids are used in automatic transmissions to get smooth shifting with the advantage of reducing mechanical load of the oil pump. A linear solenoid is used to vary the position of the armature by varying the current level applied thereto. However, linear control valves tend to be characterized by less variation in control pressure since the armature is not traveling from stop to stop during each PWM cycle while using higher PWM operating frequencies. Linear control valves are generally operated with an amount of dither in the current through the solenoid coil to effectuate a mechanical analog upon the armature which trades control pressure variation for hysteretic performance improvements. In PWM applications, the dither is essentially a function of the impedance characteristics of the solenoid coil and the PWM frequency of the drive signal. All else being equal, PWM frequency increases tend to increase hysteresis and require reduction in armature friction forces.

The opening point for a normally low control pressure linear valve or closing point for a normally high control pressure linear valve are critical since the force generated in a respective linear magnetic circuit is limited in magnitude. It will be noted that the normally low and high control pressures refer to a de-energized state of the a respective linear magnetic circuit. Furthermore, dimensional stack up is a significant source of part-to-part variation. In addition, hydraulic forces acting on the linear valves are a significant source of instability since the armature needs to be at a specific position to control the output signal as the current input varies.

Existing solenoid mechanisms include two different configurations for the magnetic package while the armature motions are in opposite directions dependent on whether the linear solenoid valve is a normally high or low valve. This leads to the doubling of the design efforts and resource issues relative to proliferation.

As such, the present invention has recognized these prior art drawbacks, and has provided the below-disclosed solutions to one or more of the prior art deficiencies.

SUMMARY

In an exemplary embodiment, a method for controlling a plunger of a magnetic actuator assembly is disclosed. The method includes: generating a magnetic flux at the plunger; biasing the plunger by means of the first magnetic flux opposing a first bias from a first spring, the first spring having a first preload; biasing the plunger opposing the first bias with a second spring in series communication with the first spring, the second spring having a second preload less than the first preload, the second preload configured to be adjustable to control the amount of the magnetic flux needed to overcome a net total preload opposing the magnetic flux; generating a second magnetic flux at the plunger; and biasing the plunger by means of the second magnetic flux higher than the first magnetic flux to overcome the net total preload from the first spring and the second spring in series communication.

In another embodiment, a magnetic actuator assembly is disclosed. The magnetic actuator assembly includes: an armature plunger in operable communication with an actuator of the magnetic actuator; a coil configured to generate a first magnetic flux at the plunger; a first spring having a first preload in operable communication with the plunger, the plunger is biased by means of the first magnetic flux opposing a first bias from the first spring; and a second spring in series communication with the first spring, the second spring having a second preload less than the first preload, the second preload configured to be adjustable to control the amount of the magnetic flux needed to overcome a net total preload of the first and second springs opposing the magnetic flux, wherein when the coil is further energized to generate a second magnetic flux, the plunger is biased by means of the second magnetic flux larger than the first magnetic flux to overcome the net total preload from the first spring and the second spring in series communication.

The above discussed and other features and advantages of the present invention will be appreciated and understood by those skilled in the art from the following brief description of the drawings.

BRIEF DESCRIPTION OF THE DRAWINGS

Referring to the exemplary drawings wherein like elements are numbered alike in the several Figures.

DETAILED DESCRIPTION

Figure 1:
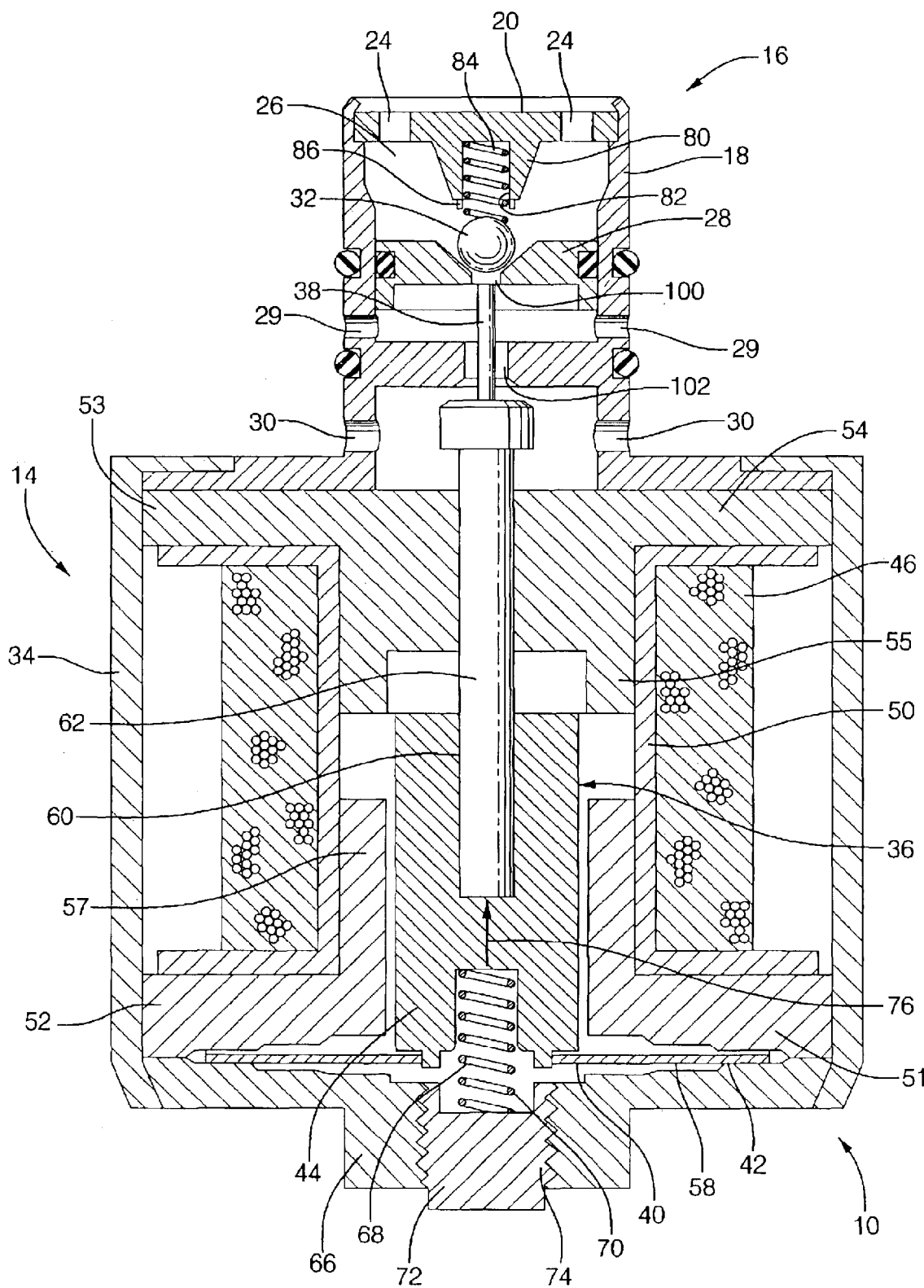
FIG. 1 is a schematic view of a normally low control pressure valve assembly in a de-energized position.
Figure 2:
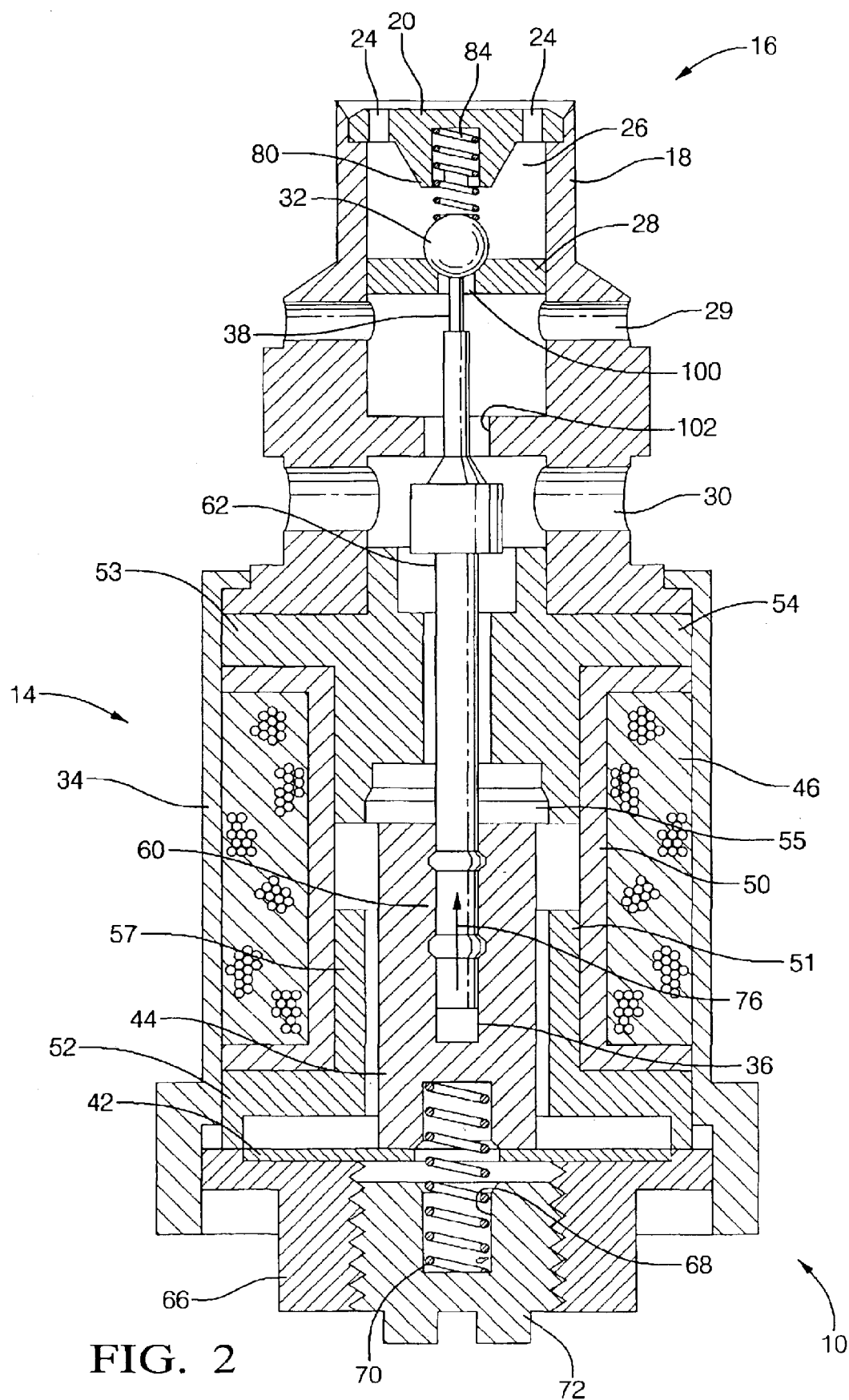
FIG. 2 is a cross-section view of the valve assembly of the valve assembly of FIG. 1 illustrating a rod and ball associated with the normally low pressure operation.

Referring now to FIGS. 1 and 2, a valve assembly 10 is illustrated. Valve assembly 10 includes an electromechanical portion generally designated by numeral 14 and a hydraulic portion generally designated by the numeral 16. The hydraulic portion 16 comprises fluid passage housing 18 with a retainer 20 having fluid inlets 24 (two shown), chamber 26, valve seat 28 and fluid control and exhaust passages 29 and 30, respectively. A ball 32, which is displaceable between a seated position against valve seat 28 as illustrated and a fully unseated position, provides for variable fluid bleed-off from fluid inlets 24 to exhaust passages 30. Aspects of fluidic operation are generally well known to those skilled in the art and further discussion thereof is not necessary for a complete understanding of the present invention. Furthermore, although two inlets 24 and two exhaust passages 30 are depicted, any number is contemplated.

The electromechanical portion 14 of valve assembly 10 includes a housing or frame 34 operably attached to housing 18 of hydraulic portion 16. Frame 34 is configured to receive a plunger assembly 36 therein. Plunger assembly 36 is configured having a valve end 38 and a stop end 40. Valve end 38 is configured to provide a means for urging ball 32 from a normally closed position to allow fluid to flow from inlets 24 to exhaust passages 30 via chamber 26. Stop end 40 is configured to make contact with a diaphragm spring 42. As will be discussed in detail below, diaphragm spring 42 is employed to provide smooth translation of plunger assembly 36 by providing alignment of a plunger 44 of the plunger assembly 36 with respect to a primary plate or pole piece 54 reducing axial components of magnetic force.

In an exemplary embodiment, valve assembly 10 is secured to a conduit supplying a hydraulic fluid for use in automotive applications such as an automatic transmission. Of course, and as contemplated in accordance with the instant application, valve assembly 10 may be secured to any type of conduit or tube supplying a liquid, gas or pressurized gas from a supply to a desired location.

Valve assembly 10 is constructed so that a plunger 44 of plunger assembly 36 is manipulated between a closed position (see FIG. 1), a partial open position, and a full open position (not shown).

The electromechanical portion 14 of solenoid valve assembly 10 is generally constructed with a multiple winding electrical coil 46 surrounding an armature or plunger 44 fabricated from a ferromagnetic material. Coil 46 is conventionally wrapped around a non-magnetic spool 50 as illustrated. Ferromagnetic pole pieces, generally designated, 51 and 54 are located adjacent the coil 46 at opposite axial ends thereof. Each pole piece 51 and 54 has a respective substantially annular portion, 52 and 53, extending radially beyond the outer circumference of coil 46. Pole piece 54 has a central aperture defined by the annular portion 53 and preferably continues generally within the inner sidewall of the spool to define an axially extending cylindrical portion 55 with a larger sized aperture configured to receive plunger 44 therein. Pole piece 51 also has a central aperture defined by annular portion 52 and an axially extending cylindrical portion 57 similarly sized with cylinder portion 55.

Armature 44 is located substantially coaxially with the aperture through annular portion 57 of pole piece 51 such that it is in spaced adjacency with the cylindrical portion 55 of pole piece 54. This non-bearing positional relationship is provided for by a radially non-compliant member 58 which extends radially from the armature to a portion of the pole piece 51. Preferably, member 58 takes the form of diaphragm spring 40 formed from long-life stainless steel, one such exemplary material being 7C27MO2 stainless steel available from Sandvik, Inc., Fair Lawn, N.J. In the present embodiment, the armature 44 is characterized by a progressively smaller diameter section or step which provide convenient mounting provisions for staking member 58 thereto. Armature 44 is configured with a cavity 60 at an opposite end to receive a plunger rod 62 in operable communication with ball 32. Rod 62 is configured to be axially received in cavity 60 and axially aligned within the annular portion 55 of pole piece 54.

Hydraulic portion 16 of the solenoid valve assembly 10 bears against pole piece 54. Housings 18 and 34 are crimped or staked together at one end while housing 34 is crimped or rolled over a sandwich plate 66 configured to sandwich diaphragm spring 40 against annular portion 52 of pole piece 51 to retain the structures described.

At the axial end of the armature 44 closest to pole piece 51 is a bore defined by a wall 68. Located within the bore and communicating with the base thereof is a contact spring 70. The wall is preferably tapered to prevent spring 70 from binding within the bore and contributes to the overall desirable magnetic characteristics of such a linear device. The opposite end of spring 70 bears against screw 72 threaded into a non-magnetic collar 74 of sandwich plate 66. Sandwich plate 66 in turn is joined to pole piece 51 sandwiching diaphragm spring 40 by rolling housing 34 over sandwich plate 66. However, other coupling means are contemplated as will be appreciated by one skilled in the pertinent art. Screw 72 provides for a range of adjustment to the spring bias force. Collar 74 is substantially aligned with the terminal portion of tapered side wall 68 of armature 44.

Plunger 44 is constructed out of material that will be moved by a magnetic flux generated by the coil assembly of the valve assembly. Accordingly, and in accordance with the present disclosure plunger 44 is magnetically actuated in the direction defined by arrow 76. Plunger 44 is cylindrical in shape, however, of course, plunger 44 may have any configuration suitable for movement within pole pieces 51 and 54. Rod 62 is configured from a non-magnetic material and provides a single alignment point element that is located proximate the main air gap of the magnetic circuit which will maintain and correct the radial air gap in conjunction with diaphragm spring 40 at an opposite end thereof. In this manner, translation of armature 44 is less physically constrained as is commonly a problem with the mobile elements in low leak valves. In addition to providing radial alignment, diaphragm spring 40 provides a smooth axial movement of armature 44.

The opening point for a linear valve is critical since the force in linear magnetic circuits is limited in magnitude and the friction between nonmovable and movable parts is significant. To overcome the above problems, a dual spring valve assembly is proposed. One spring provides the linear behavior of the valve, i.e., position of the armature proportional to the electrical current, while the other spring is adjustable to provide a desired net preload required for a predetermined opening current requirement. Depending on the required net total preload, the adjustable spring 70 may help or hinder the magnetic circuit.

Referring again to hydraulic portion 16 of valve assembly 10, retainer 20 thereof is preferably secured by crimping or rolling housing 18 over a periphery defining retainer 20. Retainer 20 is configured as a disk having inlets 24 extending therethrough at outboard ends and includes a frustoconically shaped member 80 extending into chamber 26 from a central portion defining retainer 20. An inner portion of frustoconically shaped member 80 includes a straight wall 82 for confining a spring 84 therein. Spring 84 is configured to bias ball 32 against valve seat 28 to prevent fluid flow therethrough. An end portion 86 defining frustoconically shaped member 80 is configured as a stop for preventing further translation of ball 32 when plunger 44 is energized and causes rod 62 to bias ball 32 upward against spring 84 from the normally closed position as illustrated in FIGS. 1 and 2.

Still referring to FIGS. 1 and 2, inlets 24 disposed opposite each other and outboard of retainer 20 having member 80 and spring 84 therebetween stabilizes the hydraulic forces acting on ball 32 by directing the flow of fluid to the valve seat without unnecessary turbulence and increased flow vortices resulting from the presence of spring 84 biasing ball 32 against seat 28. The fluid flow away from spring 84 provides a more predictable linear movement of armature 44 resulting in a more precise positioning of armature 44 with respect to an output signal as the current input varies. The configuration and positioning of inlets 24 with respect to member 80 directs the flow of fluid to valve seat 28 with reduced flow vortices and reduced turbulence. It will also be noted that member 80 having wall 82 guides linear spring 84 to prevent buckling of spring 84 during performance. Furthermore, it will be recognized that spring 84 provides the initial preload while adjustable spring 70 is adjustable to further adjust a preload acting against translation of armature 44 and affecting the opening point of the valve assembly with respect to the current needed to overcome the preload.

When the preload on spring 70 is increased, the opening point current is reduced and spring 70 helps the magnetic circuit. Alternatively, when the preload of spring 70 is reduced relative to the preload provided by spring 84, the opening point current is increased and spring 70 hinders the magnetic circuit relative to the preload bias provided by spring 84. Furthermore, it will be recognized that the initial preload imparted by spring 84 does not affect an opposite preload imparted by spring 70, as the initial preload from spring 84 is imparted to ball 32 which is in turn imparted to fixedly secured valve seat 28.

Dimensional stack up is a significant source of part to part variation which affects the opening point control of different valve assemblies. Thus, in an exemplary embodiment, valve seat 28 is adjustable to reduce stack up variances due to part to part variation. Valve seat 28 is preferably threadably received within chamber 26 to adjust a distance thereof with respect end portion 86 of member 80 thus effecting the preload on spring 84 biasing ball 32 against ball seat 28 in the normally closed position.

As can be seen with reference to the Figures, the solenoid valve includes hydraulic portion 16 having two variable orifices 100 and 102 in series fluid communication. More specifically, when fluid communication from supply inlet 24 to control passage 29 is being opened via orifice 100, fluid communication from control 29 to exhaust 30 passages via orifice 102 is being closed. In this manner, it will be recognized that fluid flow in hydraulic portion 16 is at a maximum when rod is at some point between initial and full stroke potential. Therefore, in order to set the useful travel of the ball and rod moving together, the distance between the variable orifices 100 and 102 and supply inlet 24 to control passages 29 is considered.

In accordance with an exemplary embodiment of the present disclosure, valve assembly 10 operates as follows. A first electrical current flows through coil 46, which creates a magnetic flux causing plunger 44 to move towards valve seat 28 and compress linear spring 84 after any net preload selected between springs 70 and 84 is met. Linear spring 84 biases ball 32 against valve seat 28 so that linear spring 84 initially controls the opening point current necessary for movement of plunger 44 since linear spring 84 opposes plunger 44 translation with a force more than the preload set on spring 70. In an exemplary embodiment, spring 84 is preferably a spring having a larger spring rate or spring constant than spring 70. In addition, regardless of spring 84 having a larger spring rate than spring 70, the effective combined spring rate of spring 84 in series with spring 70 once the preload on spring 84 is met, is less than that of the spring rate of spring 84 alone, accordingly, and in accordance with Hooke's law a greater amount of force is required to compress spring 84 and accordingly move plunger 44 compared with the series combined springs 70, 84. It will be recognized by one skilled in the art that both springs 70 and 84 are maintained in a preload condition to maintain a constant spring rate therebetween over the complete performance range.

A pulse-width-modulated source or a stepped current or voltage source or any of the other well-known electrical controls may be employed to energize coil 46. When coil 46 is energized, a magnetic field is established which induces a magnetic path through the pole pieces 54 and 51 and the valve spool 50. This creates magnetic forces which collectively urge armature 44 and rod 62 against ball 32 in an upward direction as seen in the drawing acting in the same direction 76 as a bias from spring 70.

When the forces are balanced (net spring force from spring 70, 84 plus pressure force from inlets 24 equals magnetic force) the armature 44 will be in equilibrium and a desired fluid flow will be established through valve seat 28. If a larger fluid flow is required, the magnetic force will be increased. If a lower fluid flow is desired, the magnetic force will be decreased.

The exemplary embodiment described above is fundamentally of linear proportional behavior which means that the output is controlled by means of controlling the armature's displacement or position with an input control signal. The input control signal is preferably generated from a current control driver, and alternatively from a PWM voltage driver. It will be recognized by one skilled in the pertinent art that when a PWM voltage driver is employed, the break point between low flow and high flow with reference to FIG. 1 will vary as a function of temperature and voltage variation effect.

Figure 3:
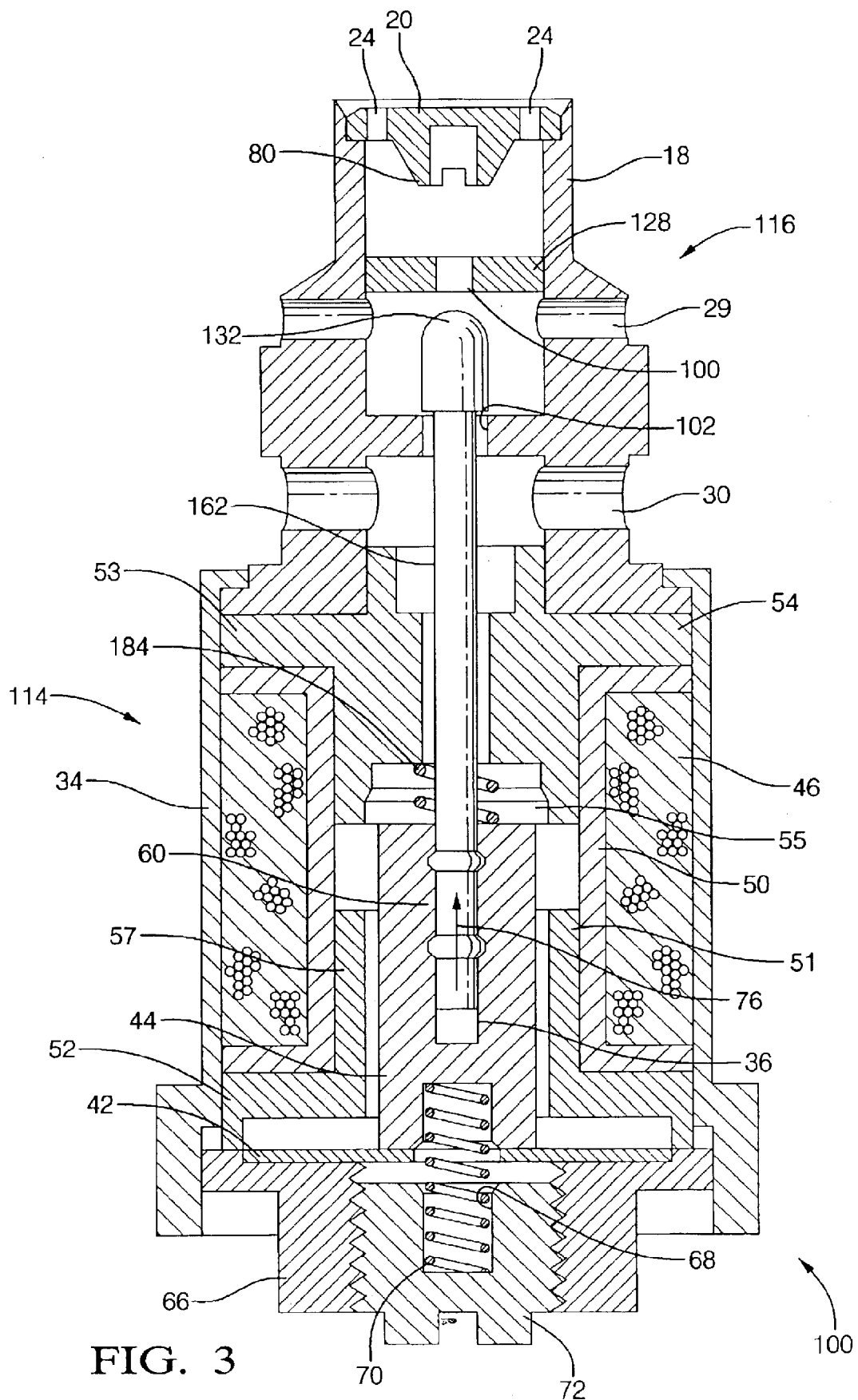
FIG. 3 is a cross-section of a normally high control pressure valve assembly in a de-energized open position illustrating an alternative rod associated with the normally high operation.

Referring now to FIG. 3, another hydraulic solenoid control valve 100 is illustrated having an electromechanical portion generally designated by the numeral 114 and a hydraulic portion generally designated by the numeral 116. Hydraulic solenoid control valve 100 depicts a normally open valve using substantially the same components as the hydraulic normally closed valve assembly 10 in FIGS. 1 and 2. The hydraulic portion 116 comprises fluid passage housing 18 including fluid inlets 24, chamber 26, an adjustable poppet seat 128 and fluid exhaust passages 30. A Poppet 132, which is displaceable between a seated position against poppet seat 128 and a fully unseated position as illustrated, provides for variable fluid bleed-off from fluid inlets 24 to exhaust passages 30. Aspects of fluidic operation are generally well known to those skilled in the art and further discussion thereof is not necessary for a complete understanding of the present disclosure.

The electromechanical portion 114 of solenoid valve 100 is generally constructed with multiple winding electrical coil 46 surrounding armature 44. Coil 46 is conventionally wrapped around non-magnetic spool 50 as illustrated. Ferromagnetic pole pieces, generally designated, 51 and 54 are located adjacent coil 46 at opposite axial ends thereof. Each pole piece 51 and 54 has a respective substantially annular portion, 52 and 53, extending radially beyond the outer circumference of coil 46. Pole piece 54 has a central aperture defined by the annular portion 53 and preferably continues generally within the inner sidewall of the spool to define axially extending cylindrical portion 55 with a larger sized aperture to allow translation of armature 44 therein. Pole piece 51 also has a central aperture defined by annular portion 52 and an axially extending cylindrical portion 57 similarly sized with cylinder portion 55.

Armature 44 is configured with cavity 60 at an opposite end to receive a plunger rod 162 in operably connected to poppet 132, which is preferably a part separately fabricated and is press fitted onto. Rod 162 is configured to be axially received in cavity 60 and axially aligned within the annular portion 55 of pole piece 54.

A linear spring 184 is disposed within annular portion 55 of pole piece 54 and is configured to provide an initial preload on a top surface defining armature 44 to maintain valve assembly 100 in the normally high position. Hydraulic portion 116 of the solenoid valve assembly 10 is coupled to electromechanical portion 114 as previously described with respect to FIGS. 1 and 2. Thus, the above valve assemblies 10 and 100 provide a substantially common electromechanical/hydraulic design for use as either a normally high or normally low control pressure valve assembly with the only differences being in the valve seat and rod employed. This design provides for process and component communization which leads to increased component and manufacturing cost efficiencies. Both configurations depicted in FIGS. 2 and 3 employ retainer 20 having one or more orifices or inlets 24 in order to provide maximum flow employing a lower current signal. It should be noted that the one or more inlets are not restrictive. However, retainer 20 in the normally high valve assembly 110 depicted in FIG. 3 is absent spring 84 disposed within member 80, because spring 184 disposed within annular portion 55 of pole piece 54 provides a similar function. Namely, an initial preload that is further adjusted by adjusting spring 70 acting in concert but opposite thereto.

In accordance with an exemplary embodiment of the present disclosure, valve assembly 100 operates as follows. A first electrical current flows through coil 46, which creates a magnetic flux causing plunger 44 to move towards seat 128 in direction 76 and compress linear spring 184 after any net preload selected between springs 70 and 184 is met. Linear spring 184 biases armature 44 away from seat 128 so that linear spring 184 initially controls the closing point current necessary for movement of plunger 44 since linear spring 184 opposes plunger 44 translation with a force more than the preload set on spring 70. In an exemplary embodiment, spring 184 is preferably a spring having a larger spring rate or spring constant than spring 70. In addition, regardless of spring 84 having a larger spring rate than spring 70, the effective combined spring rate of spring 84 in series with spring 70 once the preload on spring 84 is met, is less than that of the spring rate of spring 84 alone, accordingly, and in accordance with Hooke's law a greater amount of force is required to compress spring 184 and accordingly move plunger 44 compared with the series combined springs 70, 84. In this manner, opposing springs 70 and 184 can reduce the required current necessary to close normally open valve assembly 100 while using substantially the same envelope and magnetic design and circuitry used in the normally closed valve assembly 10 illustrated in FIGS. 1 and 2.

When the forces are balanced (net spring force from springs 70, 184 plus pressure force from inlets 24 equals magnetic force) the armature 44 will be in equilibrum and a desired fluid flow will be established through seat 128. A desired control pressure is achieved having a low leak behavior meaning that the flow rate is largest at some point between energized and de-energized states. The resulting flow vs. current curve in turn resembles a bell curve, wherein common magnetic packages in normally high and low valve assemblies result in substantially proportional linear curves.

By using two springs, a net preload may be defined to lower the opening point current needed to open a normally closed valve and close a normally open valve. As a result, increased resolution of the pressure curve is possible due to a larger dynamic range by reducing opening point control. Furthermore, by isolating the additional second spring from fluid flow, reduced turbulence allows for a more robust linear control of the ball valve or poppet. Moreover, by employing an adjustable valve seat, a more precise flow/control pressure specification results and avoids the consequences of part to art variation.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for controlling a plunger of a magnetic actuator assembly, the method comprising:

generating a magnetic flux at said plunger;

biasing said plunger by means of said first magnetic flux opposing a first bias from a first spring, said first spring having a first preload;

biasing said plunger opposing said first bias with a second spring in series communication with said first spring, said second spring having a second preload less than said first preload, said second preload configured to be adjustable to control the amount of said magnetic flux needed to overcome a net total preload opposing said magnetic flux;

generating a second magnetic flux at said plunger; and biasing said plunger by means of said second magnetic flux higher than said first magnetic flux to overcome said net total preload from said first spring and said second spring in series communication.

2. The method of claim 1 further comprising:

disposing said first and second springs on opposing sides of said plunger.

3. The method of claim 2 further comprising:

preloading said second spring with an adjustable preload, said plunger effected by said net total preload of said first spring and said second spring in series communication when said plunger matches said net total preload.

4. The method of claim 2, wherein said plunger is effected solely by said second preload of said second spring until said plunger matches said first preload of said first spring.

5. The method of claim 2 further comprising:

preloading said first spring with said first preload, said plunger effected by said first preload of said first spring and said second spring in series communication when said plunger matches said first preload.

6. The method of claim 5 further comprising:

disposing a rod extending from one end of said plunger for operable communication with a valve seat, said rod configured to operably control fluid flow through said valve seat relative to a position of said plunger;

applying said second preload via a screw in operable communication with said second spring on an opposite end of said plunger such that said second spring is preloaded biasing rod away from said screw and opposing said first spring bias.

7. The method of claim 5, wherein said first spring has a first spring rate greater than a second spring rate of said second spring.

8. The method of claim 1, wherein said first magnetic flux is generated by a first input duty cycle and said second magnetic flux is generated by a second input duty cycle larger than said first input duty cycle.

9. The method of claim 8, wherein said screw allows calibration of one of an opening point and a closing point of said valve seat with respect to a required input duty cycle to overcome said net total preload of first and second springs.

10. The method of claim 1, wherein said first and second magnetic flux is generated by at least one of a pulse width modulated (PWM) current control driver, PWM voltage driver, and PWM frequency.

11. The method of claim 6 further comprising:
disposing a fluid flow device in fluid communication with said valve seat; said flow device configured to guide inlet fluid to said valve seat reducing at least one of flow vortices and turbulence in a chamber defined between said flow device and said valve seat.

12. The method of claim 11, wherein said flow device includes two inlets disposed at outboard ends defining said flow device and a frustoconically shaped member extending between said inlets extending toward said valve seat.

13. The method of claim 12, wherein said first spring is retained within an interior portion defining said frustoconically shaped member, said first spring biasing a ball against said valve seat with said first preload.

14. The method of claim 13, wherein said member is configured to guide said spring from buckling and guide fluid away from said spring.

15. The method of claim 14, wherein an end defining a smaller annular end of said member is configured as a stop for said ball.

16. The method of claim 12, wherein said valve seat is adjustable to limit variable dimensional stack up due to part to part variation.

17. The method of claim 12, wherein said plunger, first and second springs, flow device and resulting magnetic actuator assembly are employed in both normally closed and normally open valve assemblies without reconfiguring the magnetic actuator assembly and parts associated therewith.

18. A method for controlling an opening/closing point of a plunger of a magnetic actuator assembly in an automatic transmission control valve assembly in a vehicle, the method comprising:
arranging a first spring preloaded with a first preload between a first end of said plunger and a valve seat;
arranging a second spring preloaded, with a second preload smaller than said first preload between an opposite end of said first end of said plunger and a stop assembly, said first end of said plunger in operable communication with a hydraulic valve assembly, wherein said second preload is adjustable to effect a net total preload of said first and second springs thereby adjusting magnetic flux necessary to translate said plunger.

19. The method of claim 18, wherein said valve seat is adjustable.

20. The method of claim 19, wherein said valve seat is in fluid communication with a means for limiting at least one of flow vortices and turbulence of inlet fluid in said hydraulic valve assembly.

21. A magnetic actuator assembly comprising:
an armature plunger in operable communication with an actuator of the magnetic actuator;
a coil configured to generate a first magnetic flux at said plunger;
a first spring having a first preload in operable communication with said plunger, said plunger is biased by means of said first magnetic flux opposing a first bias from said first spring; and
a second spring in series communication with said first spring, said second spring having a second preload less than said first preload, said second preload configured to be adjustable to control the amount of said magnetic flux needed to overcome a net total preload of said first and second springs opposing said magnetic flux,
wherein when said coil is further energized to generate a second magnetic flux, said plunger is biased by means of said second magnetic flux larger than said first magnetic flux to overcome said net total preload from said first spring and said second spring in series communication.

22. The assembly of claim 21, wherein said first and second springs are disposed on opposing sides of said plunger.

23. The assembly of claim 22, wherein said second spring is preloaded with an adjustable preload, said plunger effected by said net total preload of said first spring and said second spring in series communication when said plunger matches said net total preload.

24. The assembly of claim 22, wherein said plunger is effected solely by said second preload of said second spring until said plunger matches said first preload of said first spring.

25. The assembly of claim 22, wherein said plunger effected by said first spring and said second spring in series communication when said plunger matches said first preload.

26. The assembly of claim 25 further comprising:
a rod extending from one end of said plunger for operable communication with a valve seat, said rod configured to operably control fluid flow through said valve seat relative to a position of said plunger; and
a screw configured to apply said second preload to said second spring on an opposite end of said plunger such that said second spring is preloaded biasing rod away from said screw and opposing said first spring bias.

27. The assembly of claim 25, wherein said first spring has a first spring rate greater than a second spring rate of said second spring.

28. The assembly of claim 21, wherein said first magnetic flux is generated by a first input duty cycle and said second magnetic flux is generated by a second input duty cycle larger than said first input duty cycle.

29. The assembly of claim 28, wherein said screw allows calibration of one of an opening point and a closing point of said valve seat with respect to a required input duty cycle to overcome said net total preload of first and second springs.

30. The assembly of claim 21, wherein said first and second magnetic flux is generated by at least one of a pulse width modulated (PWM) current control driver, PWM voltage driver, and PWM frequency.

31. The assembly of claim 26 further comprising:
a fluid flow device in fluid communication with said valve seat; said flow device configured to guide inlet fluid to said valve seat reducing at least one of flow vortices and turbulence in a chamber defined between said flow device and said valve seat.

32. The assembly of claim 31, wherein said flow device includes two inlets disposed at outboard ends defining said flow device and a frustoconically shaped member extending between said inlets extending toward said valve seat.

33. The assembly of claim 32, wherein said first spring is retained within an interior portion defining said frustoconically shaped member, said first spring biasing a ball against said valve seat with said first preload.

34. The assembly of claim 33, wherein said member is configured to at least one of guide said spring from buckling and guide fluid away from said spring.

35. The assembly of claim 34, wherein an end defining a smaller annular end of said member is configured as a stop for said ball.

36. The assembly of claim 32, wherein said valve seat is adjustable to limit variable dimensional stack up due to part to part variation.

37. The assembly of claim 32, wherein said plunger, first and second springs, flow device and resulting magnetic actuator assembly are employed in both normally closed and normally open valve assemblies without reconfiguring the magnetic actuator assembly and parts associated therewith.

38. A magnetic actuator assembly for controlling a plunger in an automatic transmission control valve assembly in a vehicle comprising:

a first spring preloaded with a first preload disposed between a first end of said plunger and a valve seat;

a second spring preloaded with a second preload smaller than said first preload between an opposite end of said first end of said plunger and a stop assembly, said first end of said plunger in operable communication with a hydraulic valve assembly having said valve seat, wherein said second preload is adjustable to effect a net total preload of said first and second springs thereby adjusting a magnetic flux necessary to translate said plunger.

39. The assembly of claim 38, wherein said valve seat is adjustable.

40. The assembly of claim 39, wherein said valve seat is in fluid communication with a means for limiting at least one of flow vortices and turbulence of inlet fluid to said hydraulic valve assembly.

* * * * *